United States Patent [19]

Jordan

[11] 3,815,025
[45] June 4, 1974

[54] LARGE-SCALE INTEGRATED CIRCUIT TESTING STRUCTURE

[75] Inventor: Paul Vincent Jordan, Poughkeepsie, N.Y.

[73] Assignee: International Business Machines Corporation, Armonk, N.Y.

[22] Filed: Oct. 18, 1971

[21] Appl. No.: 190,025

[52] U.S. Cl............................................. 324/73 R
[51] Int. Cl......................................... G01r 31/26
[58] Field of Search............. 324/73 R; 235/153 AC

[56] References Cited
UNITED STATES PATENTS
3,582,633   6/1971   Webb............................ 324/73 R OTHER PUBLICATIONS
Williams, M. J. Y.; "Enhancing . . . "; Report No. SU-SFL-70-065, Stanford Elect. Labs.; Sept. 1970.

*Primary Examiner*—Alfred E. Smith
*Assistant Examiner*—Ernest F. Karlsen
*Attorney, Agent, or Firm*—Kenneth R. Stevens

[57] ABSTRACT

A plurality of sequential logic circuits are connected to a shift register, both located on the same semiconductor chip. Input test data supplied at a chip input pad is routed via parallel paths interconnecting the sequential logic circuits to the shift register for performing combinatorial logic tests. The test responses are accessible to a chip output pad via the shift register. The shift register functions as virtual input/output pads so as to permit combinatorial logic testing on high density sequential logic circuits without increasing the actual input/output pad requirements of the semiconductor chip.

6 Claims, 2 Drawing Figures

INVENTOR
PAUL V. JORDAN
BY Kenneth R. Steven
ATTORNEY

LARGE-SCALE INTEGRATED CIRCUIT TESTING STRUCTURE

BACKGROUND OF THE INVENTION

This invention relates to testing, and more particularly, to structure for testing semiconductor chip integrated circuits.

As densities increase in large-scale integration circuits, it becomes more difficult to provide adequate testing because individual circuits are not accessible as is the case with discrete components. Access to the logic circuits for testing purposes is constrained by the number of input and output pads on the semiconductor chip. The testing of sequential logic circuits on an integrated circuit chip yet poses another problem. Sequential logic circuits are those in which an output state is dependent not only upon the signal state at its input terminal, but is also dependent on the signal state existing on internal feedback paths. Consequently, large-scale integration testing techniques on sequential logic circuits necessitate an extremely complex routine and is much more time-consuming than a combinatorial testing scheme on the same sequential logic.

Known prior art has suggested the use of shift registers for enhancing testability of large-scale integrated circuits via test points and additional logic. However, in the known prior art cases, the additional hardware required to perform the large-scale integrated circuit testing is permanently incorporated into the circuits under test in such a manner that during normal operation of the logic circuits, the additional testing hardware adds unnecessary circuit delays. The incorporation of the hardware testing circuitry directly into the logic flow also creates another problem in that it must be compatible with the monolithic implementation of the logic circuits under test.

SUMMARY OF THE INVENTION

Thus, it is an object of the present invention to provide large-scale integration testing circuitry which can be used to input or output information at any point on the semiconductor chip, and not limited to specific logic locations.

Another object of the present invention is to provide large-scale integration testing circuitry which in addition to its testing capability can be employed to transform the function of any particular part number, for example, binary to decimal adder, or 4K bite memory to an 8K bite memory.

A further object of the present invention is to provide large-scale integration testing circuitry which can be implemented with special circuit design features, exclusive of the logic circuits under test, so as to minimize overall chip area and power dissipation.

A further object of the present invention is to provide large-scale integration testing circuitry which can be modified by dynamic engineering changes (E.C.) without affecting the logic flow of the circuits under test.

A further object of the present invention is to provide large-scale integration testing circuitry which can additionally communicate with secondary areas associated with the semiconductor chip, for example, indicator lights.

An additional object of the present invention is to provide large-scale integration testing circuitry which in addition to its testing capability can perform variable delay functions for clocking purposes.

A further object of the present invention is to provide large-scale integration testing circuitry which is not dynamically disturbed during the outputting of information from the logic circuits under test.

Still another object of the present invention is to provide large-scale integration testing circuitry which can be time-shared to maximize utilization.

Still a further object of the present invention is to provide large-scale integration testing circuitry which can be employed in testing loops not limited to circuit latches alone.

DESCRIPTION OF THE PREFERRED EMBODIMENT

Figure 1:
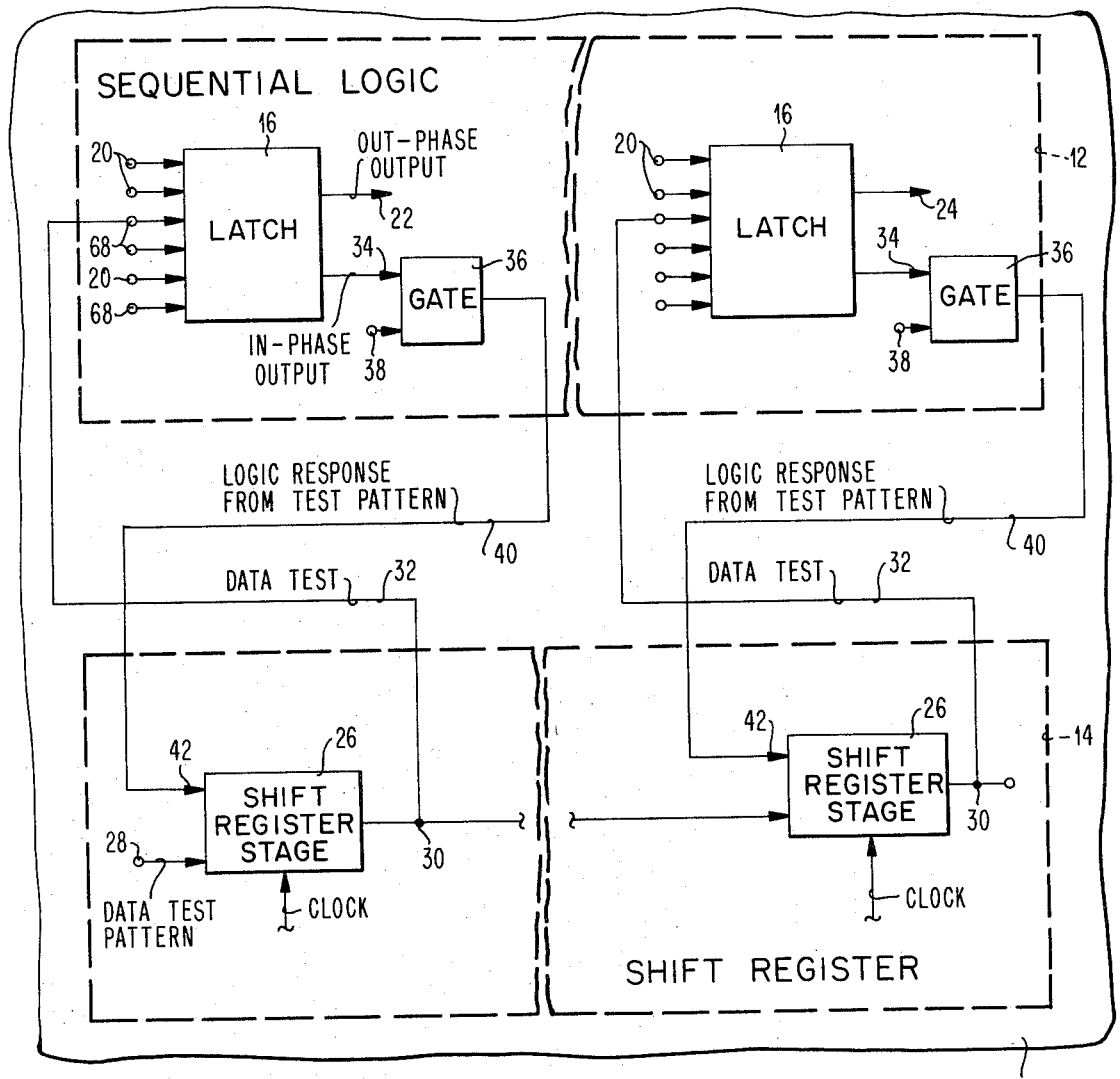
FIG. 1 is a schematic representation illustrating a semiconductor chip comprising the sequential logic circuitry under test and the testing circuit hardware incorporated integrally with the chip itself.

Now referring to FIG. 1, the large-scale integration testing circuit arrangement includes a semiconductor chip schematically represented at 10, having monolithic sequential logic circuitry means 12 formed therein. The sequential logic circuits are monolithically implemented according to any of the well known fabrication techniques.

A memory means 14 is monolithically fabricated on the same semiconductor chip 12 in order to access information into and out of the sequential logic circuitry 12.

The specific sequential logic circuitry 12 is illustrated as comprising a plurality of latch circuits 16. The plurality of latches 16 are interconnected with each other and with other type logic elements (not shown) according to the desired logic requirements intended for the semiconductor chip. During normal operation, the sequential logic circuit receives logic input signals at a plurality of chip input pads 20 in order to generate a horizontal logic flow through the sequential logic circuitry means 12 via the individual output terminals 22 associated with each of the individual latch circuits 16. The final output response from the sequential logic circuitry means 12 is provided at an output terminal 24 associated with the final logic element and actually corresponds to an output pad on the semiconductor chip. The interconnection between individual latches located between the input and output latch is generally provided by interconnection metallurgy (not shown) located on the semiconductor chip. The memory means 14 for accessing data test patterns into the sequential logic circuitry means 12 comprises a plurality of shift register stages 26. The data test pattern is accessed into the first shift register stage 26 via an input pad schematically represented at 28 and selectively shifted to the desired locations by means of individual synchronization pulses schematically designated by the lines labeled clock lines. A plurality of output nodes 30 from each of the shift register stages 26 selectively applies the desired test pattern signal to the desired logic element via a line 32 connected to an input terminal at its associated latch circuit. Output responses from the individual latch circuits are read from the sequential logic circuit means 12 via respective output connections 34, and gate means 36. Selective operation of the plurality of gate means 36 is controlled via a control signal applied to the plurality of gating lines 38. Respective lines 40 from each of the gate means 36 connect to input terminal 42 for their associated shift register stage 26.

Figure 2:
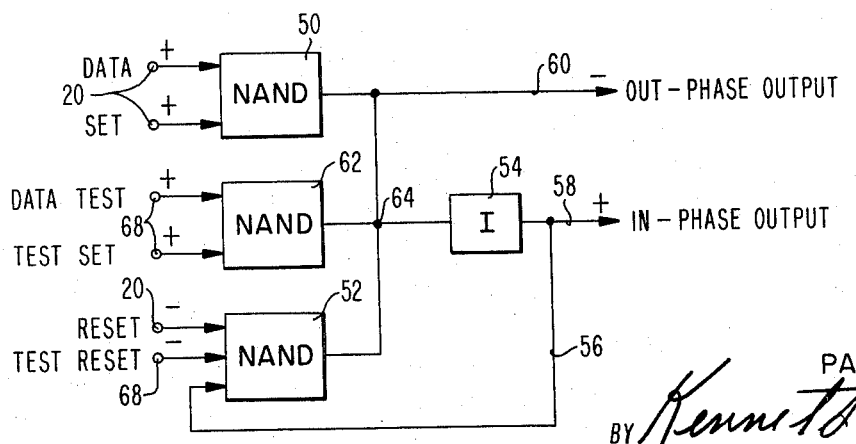
FIG. 2 is an electrical schematic representation illustrating a typical sequential logic element and the manner in which it is slightly modified for the purposes of the present invention.

As previously stated, a sequential logic circuit such as the latch circuits generally shown at 16, provide a logic output signal dependent not only upon the application of logic input signals, but upon the signal level on its various feedback interconnections. A typical latch circuit slightly modified for the purpose of the present invention is shown in FIG. 2. The Data, Set and Reset lines are connected to NAND gates 50 and 52, respectively. The combination of the NAND circuits 50 and 52 in conjunction with the invert circuit 54, and the feedback line 56 generate a conventional in-phase output signal on output line 58 and an out-of-phase output signal on line 60 in a well-known manner. Additionally, another NAND gate 62 is connected to node 64 in order to handle the testing operation. Data Test and Test Set signals are received at the input terminals of NAND gate 62, and the Test Reset signal is received at an upper input terminal to NAND circuit 52, and collectively correspond to the terminals labeled 68 associated with the latch circuit 16. In other words, the input terminals 20 to the input latch 16 are employed to perform conventional logic functions, and the terminals labeled 68 provide test signals during the combinatorial testing of the sequential logic circuit means 12.

Thus it can be seen that the gating circuitry such as gates 36 and NAND gate 62 connected to logic circuit 16 comprises an interconnection means for connecting the sequential logic circuitry, namely NAND gates 50 and 52, to a memory testing means or shift register 14.

OPERATION OF THE INVENTION

In order to perform combinatorial testing of the sequential logic circuit means 12, a Data Test Pattern is applied to the plurality of shift register stages 26 via an input pad terminal 28 under control of the Clock Lines. This information is supplied via lines 32 as a Data Test signal to its associated latch circuit 16 at the uppermost input line labeled 68. The logic response from each of the individual latch circuits 16 is then entered into the shift register via its associated output line 40 connected to an input terminal 42 at each of the individual shift register stages 26. It is thus seen that the memory means 14 is capable of selectively performing combinatorial logic on a sequential logic circuit means 12 without hindering the normal logic flow of information between the respective latches 16, as the plurality of shift register stages 26 are located external to the sequential logic circuitry means 12. Thus, the memory means 14 functions as input/output pads for testing purposes.

While the invention has been particularly shown and described with reference to the preferred embodiment thereof, it will be understood by those skilled in the art that the foregoing and other changes in form and details may be made therein without departing from the spirit and scope of the invention.

What is claimed is:

1. Large-scale integrated circuit testing structure for a semiconductor chip having a plurality of input and output pads comprising:
   a. sequential logic circuitry means connected to at least a first chip input pad and to at least a first chip output pad for providing a logic flow of information between said first input and output pads,
   b. memory testing means connected to said sequential logic circuitry and including input and output terminals for receiving a data test pattern and for delivering a combinatorial output test pattern response, said memory testing means being located external to said logic flow associated with said sequential logic circuitry means,
   c. interconnection means connecting said sequential logic circuitry means to said memory means for selectively applying a data test pattern stored in said memory means to said sequential logic circuitry means for establishing a predetermined logic condition therein,
   d. said sequential logic circuitry means being responsive to logic signals for generating a combinatorial output test pattern response,
   e. said interconnection means being further responsive for selectively transmitting the combinatorial output test pattern responses from said logic circuitry means into said memory testing means, whereby
   f. said memory testing means functions as virtual chip input/output pads for the semiconductor chip.

2. Large-scale integrated circuit testing structure for a semiconductor chip having input and output pads as in claim 1 wherein:
   a. said sequential logic circuitry means comprises a plurality of logic elements each having input and output terminals, and
   b. said memory testing means comprises a plurality of shift register stages.

3. Large-scale integrated circuit testing structure for a semiconductor chip having input and output pads as in claim 2 wherein:
   a. said interconnection means includes first gating means connected to said logic element output terminals,
   b. said first gating means being selectively responsive to control signals for reading test pattern responses from said individual logic elements into said plurality of shift register stages.

4. Large-scale integrated circuit testing structure for a semiconductor chip having input and output pads including device structure as in Claim 3 further including:
   a. second gating means connected to said logic element input terminals for reading said data test pattern into said plurality of logic elements.

5. Large-scale integrated circuit testing structure for a semiconductor chip having input and output pads including device structure as in claim 4 wherein:
   a. each one of said plurality of logic elements are selectively functionally independent and interconnected to a predetermined one of said plurality of shift register stages.

6. Large-scale integrated circuit testing structure for a semiconductor chip having input and output pads including device structure as in claim 5 wherein:
   a. said individual logic elements comprise latch circuits.

* * * * *